United States Patent
Hung et al.

(10) Patent No.: US 10,263,813 B1
(45) Date of Patent: Apr. 16, 2019

(54) SIGNAL RECEIVING APPARATUS AND SIGNAL PROCESSING METHOD THEREOF

(71) Applicant: MStar Semiconductor, Inc., Hsinchu, Hsien (TW)

(72) Inventors: Chia-Chun Hung, Hsinchu Hsien (TW); Ting-Nan Cho, Hsinchu Hsien (TW); Kai-Wen Cheng, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/988,110

(22) Filed: May 24, 2018

(30) Foreign Application Priority Data

Mar. 31, 2018 (TW) .............................. 107111521 A

(51) Int. Cl.
*H04L 25/03* (2006.01)
*H04L 27/00* (2006.01)

(52) U.S. Cl.
CPC .... *H04L 25/03057* (2013.01); *H04L 27/0014* (2013.01); *H04L 2025/0349* (2013.01); *H04L 2025/03356* (2013.01); *H04L 2027/0067* (2013.01); *H04L 2027/0069* (2013.01); *H04L 2027/0081* (2013.01)

(58) Field of Classification Search
CPC ..... H04L 2027/0067; H04L 2027/0069; H04L 2027/0081; H04L 27/0014
See application file for complete search history.

(56) References Cited

U.S. PATENT DOCUMENTS

| 8,072,383 B1* | 12/2011 | Martin | G01S 5/0221 342/387 |
|---|---|---|---|
| 2003/0223507 A1* | 12/2003 | De Gaudenzi | H04L 27/3411 375/279 |
| 2006/0285618 A1 | 12/2006 | Shoor | |
| 2007/0030931 A1* | 2/2007 | Arambepola | H03G 3/345 375/346 |
| 2008/0101497 A1 | 5/2008 | Gaikwad et al. | |
| 2009/0316842 A1 | 12/2009 | Lu et al. | |
| 2014/0064347 A1* | 3/2014 | Plotke | H04L 27/0014 375/226 |

* cited by examiner

*Primary Examiner* — Ross Varndell
(74) *Attorney, Agent, or Firm* — McClure, Qualey & Rodack, LLP

(57) ABSTRACT

A signal receiving apparatus includes a phase recovery look, a phase estimation circuit, a phase noise detection circuit, and a bandwidth setting circuit. The phase recovery loop performs a phase recovery process on an input signal according to a bandwidth setting. The phase estimation circuit generates an estimated phase associated with the input signal. The phase noise detection circuit determines a phase noise amount according to the estimated phase. The bandwidth setting circuit calculates an average and a variance of the phase noise amounts, and adjusts the bandwidth setting of the phase recovery loop according to the average and the variance.

14 Claims, 7 Drawing Sheets

SIGNAL RECEIVING APPARATUS AND SIGNAL PROCESSING METHOD THEREOF

This application claims the benefit of Taiwan application Serial No. 107111521, filed Mar. 31, 2018, the subject matter of which is incorporated herein by reference.

BACKGROUND OF THE INVENTION

Field of the Invention

The invention relates to a communication system, and more particularly to a time-domain decision-feedback equalizer in a communication system.

Description of the Related Art

Digital television broadcasting has become increasingly common along with the progress of communication technologies. In addition to cables and mobile communication base stations, digital television signals can also be transmitted by way of artificial satellites. The Digital Video Broadcasting-Satellite (DVB-S) standard is one of the most widely used standards in the field. FIG. 1 shows a partial function block diagram of a DVB-S receiving end, which includes a down-conversion circuit 110, an oscillator 120, a phase recovery loop 130, a phase estimation circuit 140, a phase noise detection circuit 150 and a bandwidth setting circuit 160. The oscillator 120 generates a reference clock signal $S_R$ for the down-conversion circuit 110 to accordingly down-convert a radio-frequency (RF) $y_{RF}$ to a baseband signal y. The phase recovery loop 130 determines and accordingly compensates a phase error in the baseband signal y. The task of the phase estimation circuit 140, the phase noise detection circuit 150 and the bandwidth setting circuit 160 is setting an appropriate bandwidth for the phase recovery loop 130. For the phase recovery loop 130 having a smaller bandwidth, phase error can be tracked at higher accuracy although it is harder to achieve a locked state. In contrast, for the phase recovery loop 130 having a larger bandwidth, it is easier to achieve a locked state although less accurate phase error tracking is provided. Details of how the above circuits perform phase recovery and loop bandwidth setting are given below.

The phase recovery loop 130 includes a phase compensation circuit 131, a data shunt circuit 132, a phase error detector 133, a loop filter 134 and a numerically-controlled oscillator (NCO) 135. An output signal from a common transmitter is designed to include data of certain content for a receiver to use as reference values in a signal processing process of the receiver. Taking the DVB-S specifications for example, the baseband signal y includes multiple segments of known data and multiple segments of unknown data appearing alternatingly. As shown in FIG. 1, the phase compensation circuit 131 performs phase compensation on the baseband signal y according to a phase compensation signal Sc provided by the NCO 135 to generate a compensated signal z. Correspondingly, the compensated signal z also includes multiple segments of compensated known data and multiple segments of compensated unknown data. The data shunt circuit 132 captures the segments of compensated unknown data (denoted as $z_U$ in FIG. 1) from the compensated signal z and provides the same to the phase error detector 133. The phase error detector 133 calculates an estimated phase error φ in each set of the compensated unknown data $z_U$, and forwards all the estimated phase errors of all the compensated unknown data to the loop filter 134 to calculate an average $\bar{\phi}$ of the estimated phase errors φ. The NCO 135 then adjusts the phase compensation signal Sc according to the average $\bar{\phi}$ generated by the loop filter 134. As shown in FIG. 1, the bandwidth setting circuit 160 usually changes the bandwidth of the phase recovery loop 130 by adjusting the resistance value in a component in the loop filter 134.

The data shunt circuit 132 captures the compensated known data (denoted as $z_K$ in FIG. 1) from the compensated signal z, and provides the same to the phase estimation circuit 140. The phase estimation circuit 140 calculates estimated phases $\theta_E$ respectively according to the segments of compensated known data. The phase noise detection circuit 150 calculates multiple corresponding phase noise amounts PN according to the estimated phases $\theta_E$. In current solutions, the bandwidth setting circuit 160 determines a bandwidth setting BW of the phase recovery loop 130 according to absolute values of multiple phase noise amounts PN. For example, when the absolute value of the phase noise amount PN is higher than a threshold, the bandwidth setting circuit 160 sets the phase recovery loop 130 to have a larger bandwidth, accordingly reducing the issue of locking difficulties; when the absolute value of the phase noise amount PN is lower than the threshold, the bandwidth setting circuit 160 sets the phase recovery loop 130 to have a smaller bandwidth.

An issue of the bandwidth setting mechanism in FIG. 1 is that, it is more suitable for a situation where a propagation environment of signals is an additive white Gaussian noise (AWGN) channel. If the propagation environment of the RF signal $y_{RF}$ is not a pure AWGN channel, or deviation exists in the antenna polarization direction setting of the receiving end (i.e., the antenna polarization direction setting has offset from the actual polarization direction), the distribution pattern of the phase noise amount PN is much more complex. As a result, the absolute value of the phase noise amount PN is insufficient for thoroughly reflecting characteristics of the phase noise amount PN, and determining the bandwidth of the phase recovery loop 130 merely according to the absolute value of the phase noise amount PN may lead to errors.

SUMMARY OF THE INVENTION

The invention is directed to a signal receiving apparatus and a signal processing method thereof that are capable to resolve the phase noise issues both under AWGN or non-AWGN (not purely AWGN) environments.

According to an embodiment of the present invention, a signal receiving apparatus includes a phase recovery loop, a phase estimation circuit, a phase noise detection circuit, and a bandwidth setting circuit. The phase recovery loop performs a phase recovery process on an input signal according to a bandwidth setting. The phase estimation circuit generates an estimated phase associated with the input signal. The phase noise detection circuit determines a phase noise amount according to the estimated phase. The bandwidth setting circuit calculates an average and a variance of the phase noise amount, and adjusts the bandwidth setting of the phase recovery loop according to the average and the variance.

According to another embodiment of the present invention, a signal processing method includes: generating an estimated phase associated with an input signal; determining a phase noise amount according to the estimated phase; calculating an average and a variance of the phase noise amount; and adjusting, according to the average and the variance, a bandwidth setting of a phase recovery process performed on the input signal.

The above and other aspects of the invention will become better understood with regard to the following detailed description of the preferred but non-limiting embodiments. The following description is made with reference to the accompanying drawings.

Figure 1:
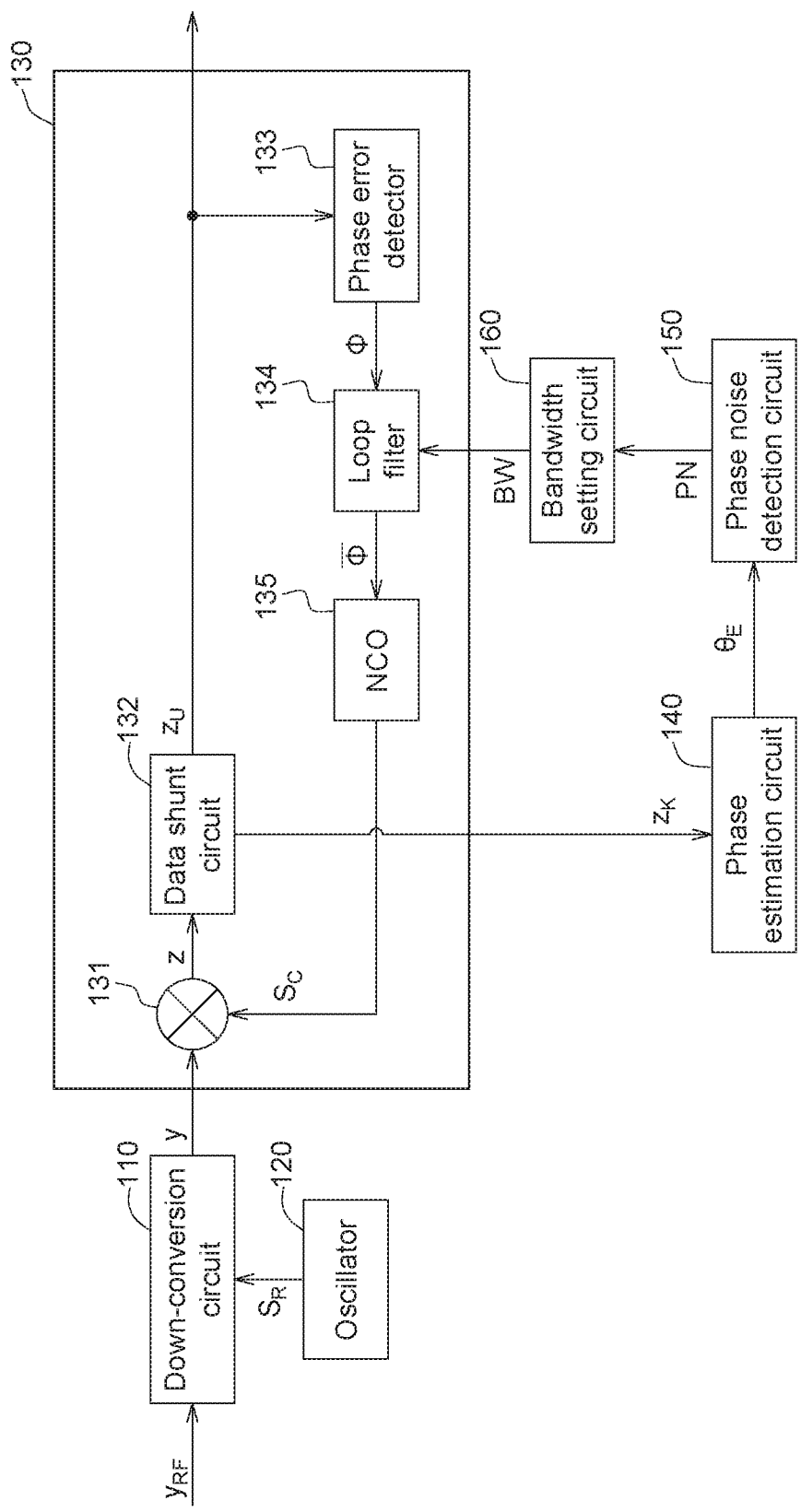
FIG. 1 (prior art) is a partial function block diagram of a Digital Video Broadcasting-Satellite (DVB-S) receiving end.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 2:
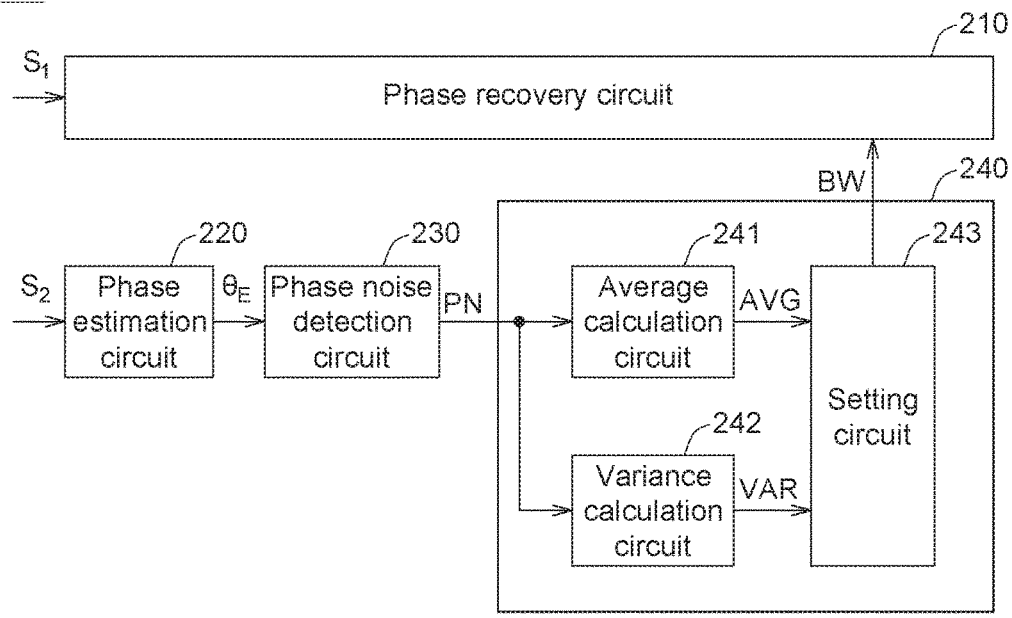
FIG. 2 is a function block diagram of a signal receiving apparatus according to an embodiment of the present invention.

FIG. 2 shows a function block diagram of a signal processing apparatus according to an embodiment of the present invention. The signal processing apparatus 200 includes a phase recovery loop 210, a phase estimation circuit 220, a phase noise estimation circuit 230, and a bandwidth setting circuit 240. It should be noted that, the circuit design of the bandwidth setting circuit 240 is different from that of the bandwidth setting circuit 160 above. In practice, the signal receiving apparatus 200 may be implemented in various signal processing systems needing to set the bandwidth of a phase recovery loop according to a phase noise amount, for example but not limited to, the DVB-S receiving end in FIG. 1.

In brief, the phase recovery circuit 210 performs a phase recovery process on an input signal $S_1$ according to a bandwidth setting BW. The phase estimation circuit 220 generates an estimated phase $\theta_E$ associated with the input signal $S_1$. Taking the DVB-S receiving end in FIG. 1 for instance, the phase recovery loop 210 performs a phase recovery process on the baseband signal y. The phase estimation circuit 220 uses an input signal S2 to accordingly generate the estimated phase $\theta_E$, where the input signal S2 is the compensated known data $z_K$ corresponding to the baseband signal y. The phase noise detection circuit 230 determines a phase noise amount PN according to the estimated phase $\theta_E$, and provides the phase noise amount PN to the bandwidth setting circuit 240 as the basis for generating the bandwidth setting BW. The phase noise amount PN generated by the phase noise detection circuit 230 may be an absolute value, or may be a relative value indicating the magnitude of the phase noise.

Implementation details of the phase recovery loop 210, the phase estimation circuit 220 and the phase noise detection circuit 230 are generally known to a person skilled in the art, and are omitted herein. The function and implementation of the bandwidth setting circuit 240 are mainly described below.

Figure 3:
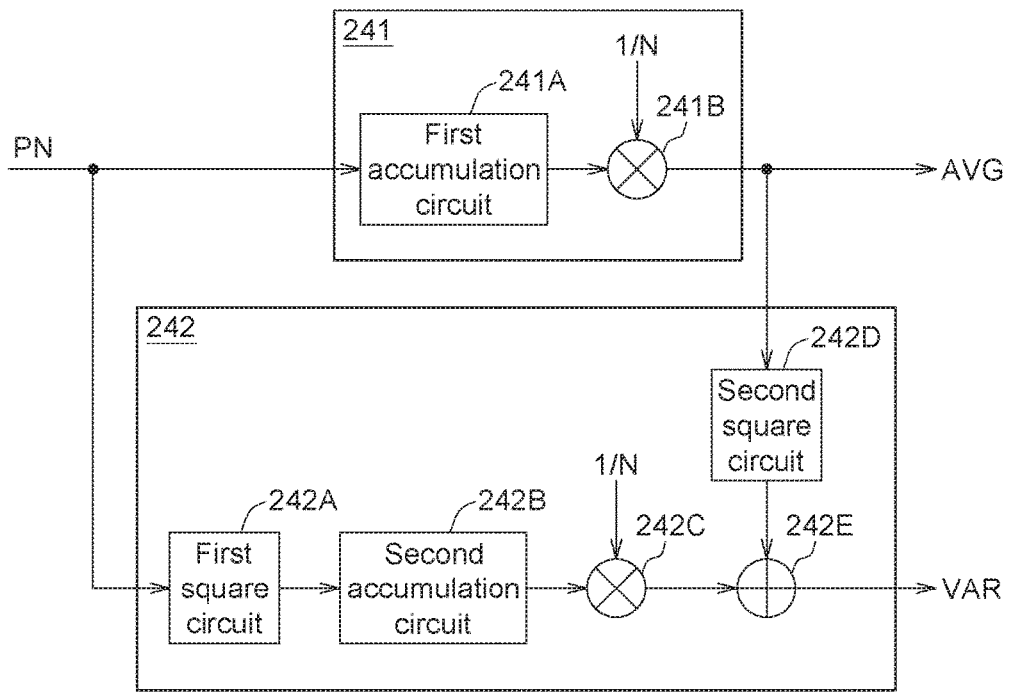
FIG. 3 is a detailed diagram of an average calculation circuit and a variance calculation circuit according to an embodiment of the present invention.

The transmission bandwidth, operation frequency and a signal-to-noise ratio (SNR) of a system and the intensity of phase noise are usually time-variant. Based on the above reason, the bandwidth setting circuit 240 of the present invention takes into account the variance of the phase noise amount when adjusting the bandwidth. As shown in FIG. 2, the bandwidth setting circuit 240 includes an average calculation circuit 241, a variance calculation circuit 242 and a setting circuit 243. The average calculation circuit 241 calculates an average AVG of the phase noise amount PN, and the variance calculation circuit 242 calculates a variance VAR of the phase noise amount PN. FIG. 3 shows a detailed diagram of the average calculation circuit 241 and the variance calculation circuit 242 according to an embodiment of the present invention. A first accumulation circuit 241A accumulates the phase noise amount PN within a predetermined period, and a multiplier 241B divides the accumulation result of the phase noise amounts PN by the number N of the phase noise amounts PN having been accumulated to accordingly generate the average AVG. A first square circuit 242A calculates a square of each phase noise amount PN; a second accumulation circuit 242B accumulates the squares; a multiplier 242C divides the accumulation result of the squares by the number N of the phase noise amounts PN having been accumulated; a second square circuit 242D calculates a square of the average AVG; and an adder 242E subtracts an output signal of the second square circuit 242D from an output signal of the multiplier 242C to accordingly generate the variance VAR. It should be noted that, the average calculation circuit 241 may generate the average AVG by calculating a weighted moving average instead. Similarly, the variance calculation circuit 242 may calculate a weighted moving variance to generate the variance VAR.

Figure 4A:
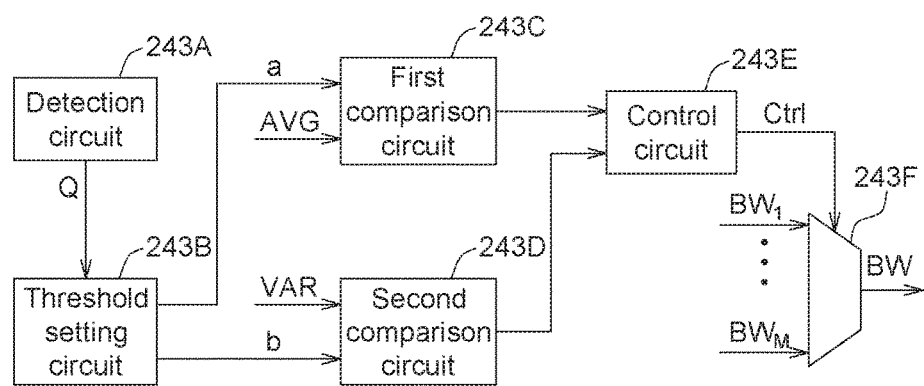
FIG. 4(A) to FIG. 4(D) are detailed diagrams of a setting circuit according to several embodiments of the present invention.

Different from the prior art that considers only the absolute value of the phase noise amount PN, the setting circuit 243 takes into account both of the average AVG and the variance VAR when determining the bandwidth setting BW. FIG. 4(A) shows a detailed diagram of the setting circuit 243 according to an embodiment. The setting circuit 243 includes a detection circuit 243A, a threshold setting circuit 243B, a first comparison circuit 243C, a second comparison circuit 243D, a control circuit 243E and a selection circuit 243F. The detection circuit 243A receives a channel quality indicator Q of a communication environment of the signal receiving apparatus 200. The channel quality indicator Q may be, for example but not limited to, a signal-to-noise ratio (SNR). The threshold setting circuit 243B determines a first threshold 'a' corresponding to the average AVG according to the channel quality indicator Q, and a second threshold 'b' corresponding to the variance VAR. In practice, the threshold setting circuit 243B may be provided therein with a look-up table (LUT) storing multiple sets of channel quality indicators Q and thresholds a/b in advance based on actual measurement or simulated operations. By taking the channel quality indicator Q detected by the SNR detection circuit 243A as an index, the threshold setting circuit 243B identifies the corresponding thresholds a/b. The first comparison circuit 243C compares the first threshold 'a' with the average AVG to generate a first comparison result C1. The second comparison circuit 243D compares the second threshold 'b' with the variance VAR to generate a second comparison result C2. As shown in FIG. 4(A), the control circuit 243E generates a control signal Ctrl according to the comparison results C1 and C2, so as to control the selection circuit 243F to select one of M bandwidth settings ($BW_1$ to $BW_M$, where M is an integer greater than) as the bandwidth setting BW provided to the phase recovery circuit 210.

Figure 4B:
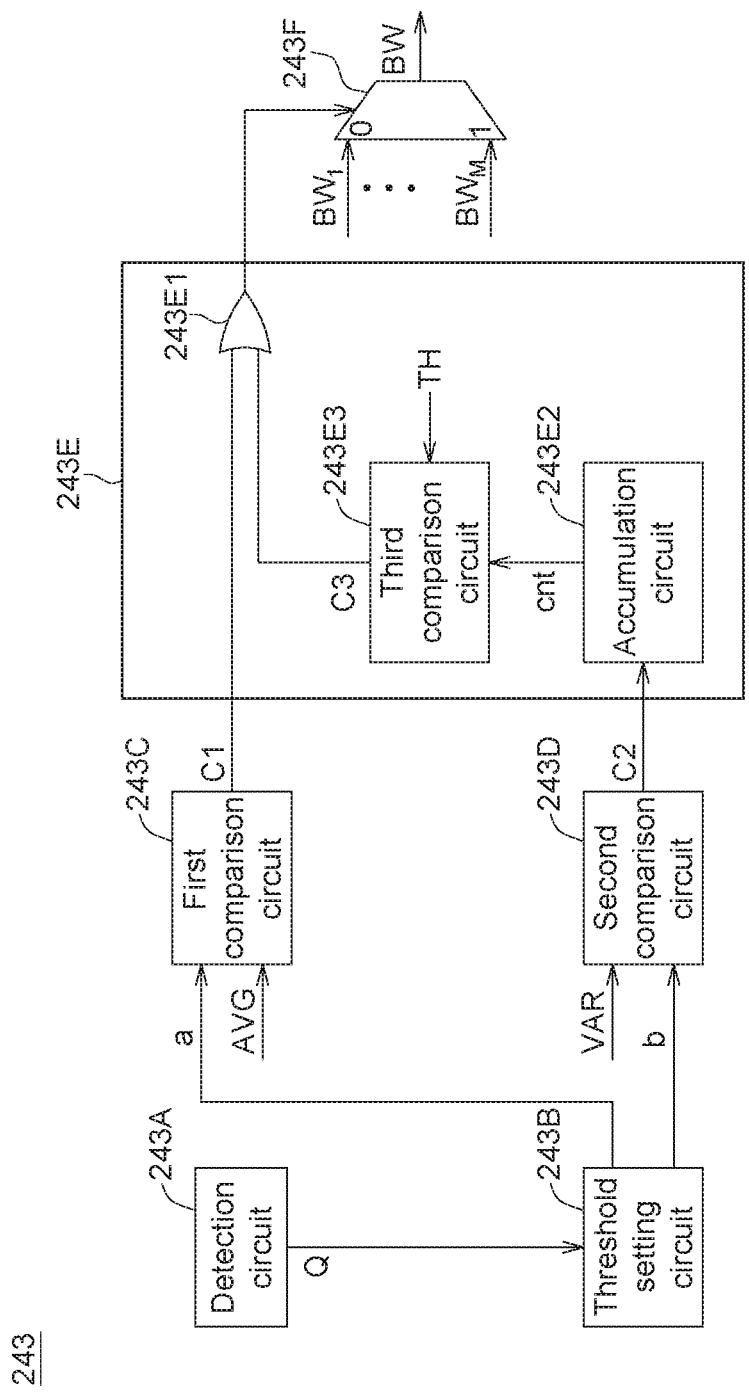

Taking the value M equal to 2 in FIG. 4(B) for instance, a detailed embodiment of the control circuit 243E is further depicted. In this embodiment, the selection circuit 243F has two bandwidth settings $BW_1$ and $BW_2$ to choose from, and it is assumed that, compared to the first bandwidth setting $BW_1$, the second bandwidth $BW_2$ causes the phase recovery loop 210 to have a larger bandwidth. The control circuit 243E includes an OR gate 243E1, an accumulation circuit 243E2, and a third comparison circuit 243E3. Assuming that when the average AVG is higher than the first threshold 'a', the first comparison circuit C1 is set as binary 1, otherwise it is set as binary 0; when the variance VAR is higher than the second threshold 'b', the second comparison result C2 is set as binary 1, otherwise it is set as binary 0. Based on the characteristics of the OR gate 243E1, given that the first comparison result C1 is 1, the selection circuit 243F outputs the second bandwidth setting $BW_2$ regardless of whether the second comparison result C2 is 0 or 1. If the first comparison result C1 is 0, the second comparison result C2 affects the selection of the selection circuit 243F, with details described as the following.

Each time the second comparison result C2 shows that the variance VAR is higher than the second threshold the accumulation result 243E2 increases an accumulation result 'cnt' (e.g., adding the accumulation result 'cnt' by one). Each time the second comparison result C2 shows that the variance VAR is not higher than the second threshold b, the accumulation circuit 243E2 reduces the accumulation result 'cnt' (e.g., subtracting the accumulation result cnt by one or resetting it to zero). The third comparison circuit 243E3 generates a third comparison result C3 according to whether the accumulation result 'cnt' is higher than a predetermined threshold TH. When the accumulation result 'cnt' is higher than the predetermined threshold TH, the third comparison result is set as binary 1, otherwise it is set as binary 0. Based on the characteristics of the OR gate 243E1, when the first comparison result C1 is 0 and the third comparison result C3 is 1, the selection circuit 243F selects the second bandwidth setting $BW_2$. In contrast, when the first comparison result C1 and the third comparison result C3 are both 0, the selection circuit 243F selects the first bandwidth setting $BW_1$. For example but not limited to, an initial value of the accumulation result cnt may be 0, and the predetermined threshold TH may be 5.

In continuation of the above, compared to the first bandwidth setting $BW_1$, the second bandwidth setting $BW_2$ causes the phase recovery loop 210 to have a larger bandwidth. In the above embodiment, only when the average AVG is lower than or equal to the first threshold 'a' and the variance VAR is lower than or equal to the second threshold 'b' for a period of time, the phase recovery loop 210 is set to use a smaller bandwidth. In numerous situations, the variance VAR gets higher as the average AVG of the phase noise amount PN increases. However, if the signal receiving apparatus 200 is not in a pure AWGN channel or if deviation exists in the antenna polarization direction setting of the receiving end, a situation where the average AVG is low but the variance VAR is high may still occur. If the average AVG of the phase noise amount PN is low but the variance VAR is high, setting the phase recovery loop 210 to have a large bandwidth is a preferred option. The reason for the above is that, the variance usually increases as the phase noise amount intensifies, and a larger bandwidth is more tolerable for larger phase noise. By taking into account both the average AVG and the variance VAR, the setting circuit 243 in FIG. 4(B) is capable of making more ideal decisions than the prior art.

Figure 4C:
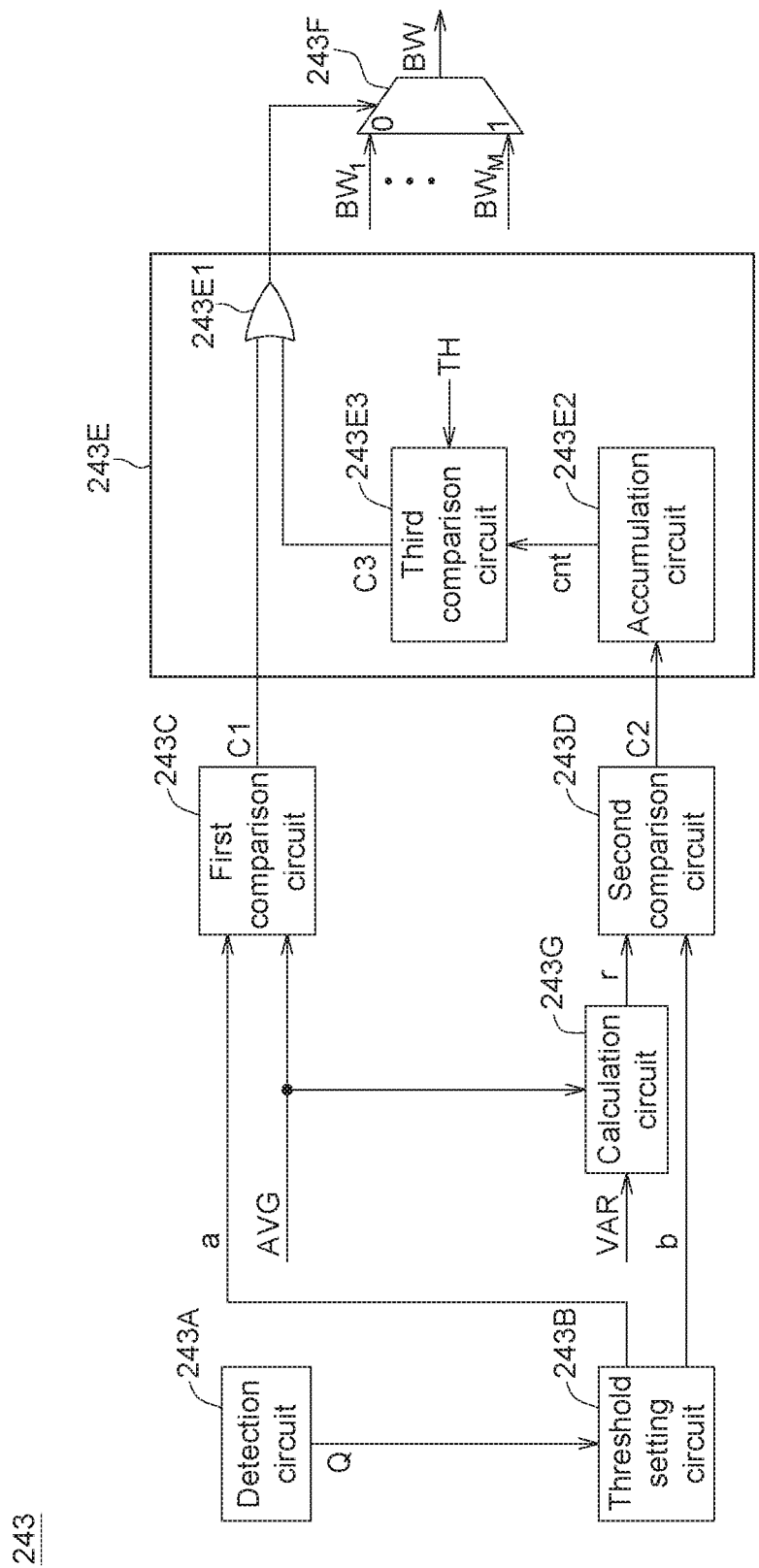

FIG. 4(C) shows a detailed diagram of the setting circuit 243 according to another embodiment of the present invention. In this embodiment, the setting circuit 243 further includes a calculation circuit 243G that calculates a value 'r' associated with the variance VAR, and the second comparison circuit 243D compares the second threshold 'b' with the value 'r'. For example but not limited to, the value 'r' may be a ratio of dividing the variance VAR by the average AVG. As previously described, the average AVG and the variance VAR usually have a certain level or correlation. Comparing the ratio 'r' but not the variance VAR with the second threshold 'b' is a concept of standardizing the variance VAR. It should be noted that, when the ratio 'r' is used as a substitution of the variance VAR and compared with the second threshold 'b', the second threshold 'b' generated by the threshold setting circuit 243B is different from the second threshold b in FIG. 4(B).

Figure 4D:
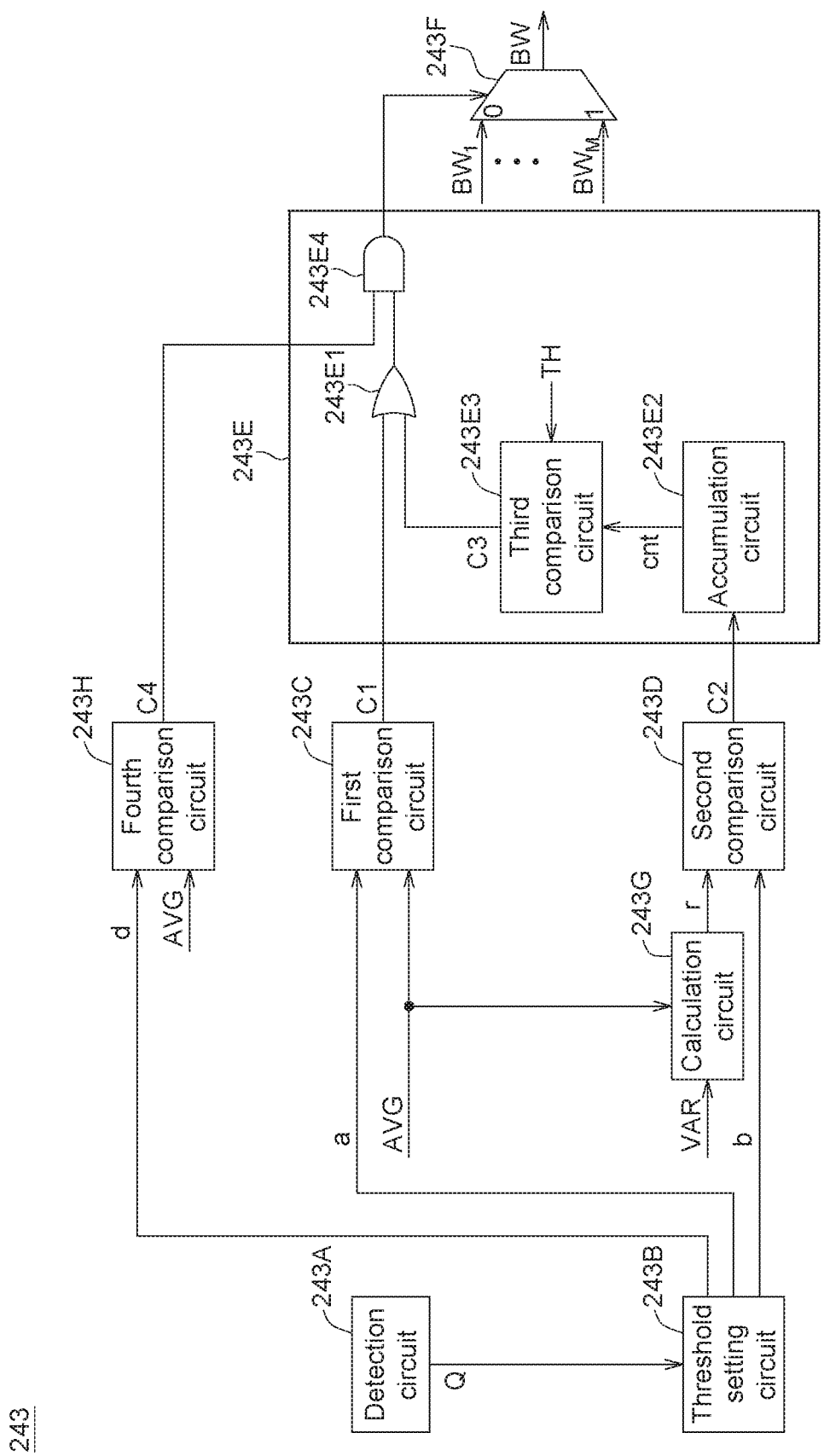

FIG. 4(D) shows a detailed diagram of the setting circuit 243 according to yet another embodiment of the present invention. In this embodiment, the setting circuit 243 further includes a fourth comparison circuit 243H, and the control circuit 243E further includes an AND gate 243E4. The fourth comparison circuit 243H compares the average AVG with a fourth threshold 'd' (similarly selected by the threshold setting circuit 243B according to the channel quality indicator Q) to generate a fourth comparison result C4. The fourth threshold d is lower than the first threshold 'a'. Assuming that when the average AVG is higher than the fourth threshold 'd', the fourth comparison result C4 is set as binary 1, otherwise it is set as binary 0. Based on the characteristics of the AND gate 243E4, given that the fourth comparison result C4 is 0, the selection circuit 243F outputs the first bandwidth setting $BW_1$ regardless of whether the output signal of the OR gate 243E1 is 0 or 1. That is to say, in this embodiment, given that the average AVG is lower to a certain level (i.e., lower than the fourth threshold d), the phase recovery loop 210 is set to use a smaller bandwidth regardless of whether the VAR is large or small.

In practice, the bandwidth setting circuit 240 in the foregoing embodiments may be implemented by multiple control and processing platforms, including fixed and programmable logic circuits, e.g., programmable gate arrays, application-specific integrated circuits, microcontrollers, microprocessors, and digital signal processors. Further, the bandwidth setting circuit 240 may also be designed to complete a designated task through executing a processor instruction stored in a memory (not shown).

Figure 5:
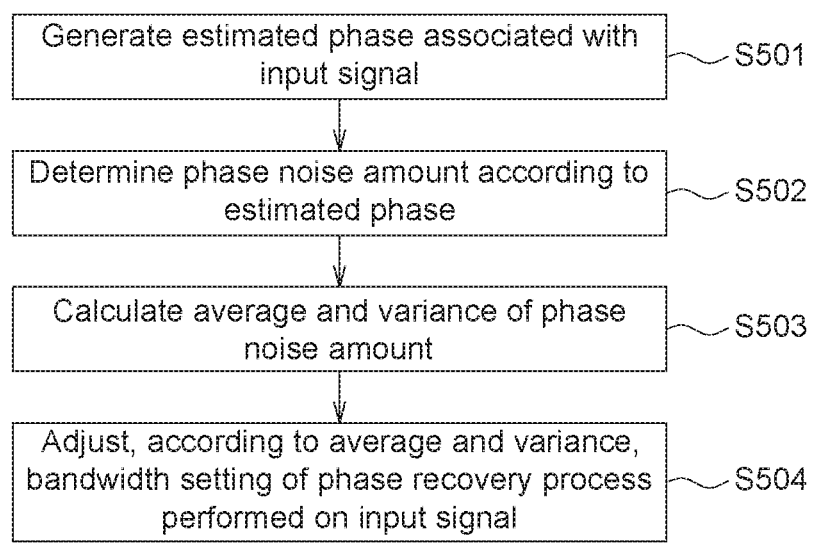
FIG. 5 is a flowchart of a signal processing method according to an embodiment of the present invention.

FIG. 5 shows a flowchart of a signal processing method according to another embodiment of the present invention. In step S501, an estimated phase associated with an input signal is generated. In step S502, a phase noise amount is determined according to the estimated phase. In step S503, an average and a variance of the phase noise amounts are calculated. In step S504, a bandwidth setting of a phase recovery process performed on an input signal is adjusted according to the average and the variance. A person skilled in the art could conceive of applying the operation details and variations in the description associated with the signal processing apparatus 200 to the signal processing method in FIG. 5, and such repeated details are omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal processing apparatus, comprising:
    a phase recovery loop, performing a phase recovery process on an input signal according to a bandwidth setting;
    a phase estimation circuit, generating an estimated phase associated with the input signal;
    a phase noise detection circuit, determining a phase noise amount according to the estimated phase; and
    a bandwidth setting circuit, calculating an average and a variance of the phase noise amount, and adjusting the bandwidth setting of the phase recovery loop according to the average and the variance,
    wherein the bandwidth setting circuit comprises:
    a detection circuit, detecting a channel quality of a communication channel where the signal processing apparatus is located to acquire a channel quality indicator;
    a threshold setting circuit, determining a first threshold and a second threshold according to the channel quality indicator;
    a first comparison circuit, comparing the average with the first threshold to generate a first comparison result;
    a second comparison circuit, comparing the variance or a value associated with the variance with the second threshold to generate a second comparison result;
    a control circuit, generating a control signal according to the first comparison result and the second comparison result; and
    a selection circuit, selecting one bandwidth setting from a plurality of bandwidth settings and providing the one bandwidth setting to the phase recovery loop.

2. The signal processing apparatus according to claim 1, wherein the channel quality indicator is a signal-to-noise ratio (SNR).

3. The signal processing apparatus according to claim 1, wherein the value associated with the variance is a ratio of the variance and the average.

4. The signal processing apparatus according to claim 1, wherein the control circuit comprises:
    an accumulation circuit, increasing an accumulation result each time the second comparison result indicates that the variance or the value associated with the variance is higher than the second threshold, and reducing the accumulation result each time the second comparison result indicates that the variance or the value associated with the variance is not higher than the second threshold;
    a third comparison circuit, generating a third comparison result according to whether the accumulation result is higher than a predetermined threshold; and
    a first logic circuit, generating the control signal according to the first comparison result and the third comparison result.

5. The signal processing apparatus according to claim 4, wherein the plurality of bandwidth settings comprise a large bandwidth setting and a small bandwidth setting; only when the first comparison result shows that the average is lower than the first threshold and the third comparison result shows that the accumulation result is not higher than the predetermined threshold, the first determination logic circuit causes the control signal to select the small bandwidth setting.

6. The signal processing apparatus according to claim 1, wherein:
    the threshold setting circuit further determines a fourth threshold lower than the first threshold, according to the channel quality indicator;
    the bandwidth setting circuit further comprises a fourth comparison circuit, generating a fourth comparison result according to whether the average is higher than the fourth threshold; and
    the control circuit comprises a second logic circuit, generating the control signal according to the first comparison result, the second comparison result and the fourth comparison result.

7. The signal processing apparatus according to claim 6, wherein the plurality of bandwidth settings comprise a large bandwidth setting and a small bandwidth setting; when the fourth comparison result shows that the average is lower than or equal to the fourth threshold, the second logic circuit causes the control signal to select the small bandwidth setting.

8. A signal processing method, applied to a signal receiving apparatus, comprising:
    (a) generating an estimated phase associated with an input signal;
    (b) determining a phase noise amount according to the estimated phase;
    (c) calculating an average and a variance of the phase noise amount; and
    (d) adjusting, according to the average and the variance, a bandwidth setting of a phase recovery process performed on the input signal,
    wherein step (d) comprises:
    (d1) detecting a channel quality of a communication channel where the signal receiving apparatus is located to acquire a channel quality indicator;
    (d2) determining a first threshold and a second threshold according to the channel quality indicator;
    (d3) comparing the average with the first threshold to generate a first comparison result;
    (d4) comparing the variance or a value associated with the variance with the second threshold to generate a second comparison result;
    (d5) generating a control signal according to the first comparison result and the second comparison result; and
    (d6) selecting one bandwidth setting from a plurality of bandwidth settings and providing the one bandwidth setting to the phase recovery process to use.

9. The signal processing method according to claim 8, wherein the channel quality indicator is a signal-to-noise ratio (SNR).

10. The signal processing method according to claim 8, wherein the value associated with the variance is a ratio of the variance and the average.

11. The signal processing method according to claim 8, wherein step (d5) comprises:
    increasing an accumulation result each time the second comparison result shows that the variance or the value associated with the variance is higher than the second threshold;

reducing the accumulation result each time the second comparison result shows that the variance or the value associated with the variance is not higher than the second threshold;

generating a third comparison result according to whether the accumulation result is higher than a predetermined threshold; and generating the control signal according to the first comparison result and the third comparison result.

12. The signal processing method according to claim 11, wherein the plurality of bandwidth settings comprise a large bandwidth setting and a small bandwidth setting; and the step of generating the control signal according to the first comparison result and the third comparison result comprises:

only when the first comparison result shows that the average is lower than the first threshold and the third comparison result shows that the accumulation result is not higher than the predetermined threshold, causing the control signal to select the small bandwidth setting.

13. The signal processing method according to claim 8, wherein step (d) further comprises:

determining a fourth threshold lower than the first threshold according to the channel quality indicator; and generating a fourth comparison result according to whether the average is higher than the fourth threshold; and step (d5) comprises:

generating the control signal according to the first comparison result, the second comparison result and the fourth comparison result.

14. The signal processing method according to claim 13, wherein the plurality of bandwidth settings comprise a large bandwidth setting and a small bandwidth setting; and the step of generating the control signal according to the first comparison result, the second comparison result and the fourth comparison result comprises:

when the fourth comparison result shows that the average is lower than or equal to the fourth threshold, causing the control signal to select the small bandwidth setting.

\* \* \* \* \*